(12) United States Patent
Rafler

(10) Patent No.: US 8,833,698 B2
(45) Date of Patent: Sep. 16, 2014

(54) OVERHEAD LUGGAGE COMPARTMENT FOR VEHICLE CABIN

(75) Inventor: Markus Rafler, Ichenhausen (DE)

(73) Assignee: Diehl Aircabin GmbH, Laupheim (DE)

( * ) Notice: Subject to any disclaimer, the term of this patent is extended or adjusted under 35 U.S.C. 154(b) by 405 days.

(21) Appl. No.: 13/207,912

(22) Filed: Aug. 11, 2011

(65) Prior Publication Data

US 2012/0038254 A1  Feb. 16, 2012

(30) Foreign Application Priority Data

Aug. 11, 2010  (DE) .......................... 10 2010 034 025

(51) Int. Cl.
| | | |
|---|---|---|
| B64D 11/00 | (2006.01) | |
| B64D 13/00 | (2006.01) | |
| B61D 37/00 | (2006.01) | |

(52) U.S. Cl.
CPC .................................. B61D 37/003 (2013.01); B64D 11/003 (2013.01)
USPC ..................................................... 244/118.5

(58) Field of Classification Search
USPC .................. 244/117 R, 118.1, 118.5; 403/83, 403/91–94, 99, 353; 296/140; 312/242, 266
See application file for complete search history.

(56) References Cited

U.S. PATENT DOCUMENTS

| | | | | |
|---|---|---|---|---|
| 3,700,199 | A * | 10/1972 | Matuska ..................... | 244/118.1 |
| 4,368,937 | A * | 1/1983 | Palombo et al. .............. | 312/325 |
| 6,857,603 | B2 * | 2/2005 | Lau et al. .................... | 244/118.1 |
| 6,886,781 | B2 * | 5/2005 | Lau et al. .................... | 244/118.1 |
| 7,128,295 | B2 * | 10/2006 | Scown ....................... | 244/118.1 |
| 7,601,004 | B2 * | 10/2009 | Lamoree et al. ................ | 439/11 |
| 7,762,737 | B2 * | 7/2010 | Schmitz et al. ............... | 403/163 |
| 7,887,008 | B2 * | 2/2011 | Lamoree et al. ............ | 244/118.1 |
| 8,016,231 | B2 * | 9/2011 | Hillen et al. ............. | 244/118.5 |
| 8,028,957 | B2 * | 10/2011 | Wolf et al. ................ | 244/118.5 |
| 8,262,022 | B2 * | 9/2012 | Young et al. ............. | 244/118.5 |
| 8,439,589 | B2 * | 5/2013 | Winkler et al. ............. | 403/119 |
| 2002/0074913 | A1 * | 6/2002 | Lau et al. ..................... | 312/307 |
| 2004/0135030 | A1 * | 7/2004 | Lau et al. ................. | 244/118.1 |
| 2004/0140398 | A1 * | 7/2004 | Lau et al. .................. | 244/118.1 |
| 2006/0151668 | A1 * | 7/2006 | Scown ....................... | 244/118.1 |
| 2007/0018043 | A1 * | 1/2007 | Lamoree et al. ........... | 244/118.1 |
| 2008/0073462 | A1 * | 3/2008 | Wolf et al. ................. | 244/118.1 |
| 2008/0078871 | A1 * | 4/2008 | Munson et al. ............ | 244/118.5 |
| 2008/0112754 | A1 * | 5/2008 | Schmitz et al. .............. | 403/350 |

(Continued)

FOREIGN PATENT DOCUMENTS

DE  10 2007 003 363 A1  7/2008

*Primary Examiner* — Tien Dinh
*Assistant Examiner* — Michael A Fabula
(74) *Attorney, Agent, or Firm* — Scully, Scott, Murphy & Presser, P.C.

(57) ABSTRACT

An overhead luggage compartment for a vehicle cabin is provided. The compartment has a ledge pivotably held about a pivot axis in a housing half-shell. The ledge is connected to the housing half-shell through a damper for damping a pivoting movement. One end of the camper is attached to a ledge side wall. The other end of a damper is attached to a damper fastening element. The damper fastening element is rotatably attached to the ledge side wall about the pivot axis. A damper mating fastening element corresponding to the damper fastening element is fixedly attached to a housing half-shell side wall opposing the ledge side wall. With an engagement of the damper fastening element in the damper mating fastening element, a connection, which is fixed in terms of rotation, is made between the damper fastening element and the damper mating fastening element.

17 Claims, 5 Drawing Sheets

(56) References Cited

U.S. PATENT DOCUMENTS

| | | | |
|---|---|---|---|
| 2008/0180006 A1* | 7/2008 | Hillen et al. | 312/245 |
| 2011/0139929 A1* | 6/2011 | Young et al. | 244/118.5 |
| 2011/0253837 A1* | 10/2011 | Lee et al. | 244/118.5 |
| 2012/0038253 A1* | 2/2012 | Rafler et al. | 312/237 |
| 2012/0325963 A1* | 12/2012 | Young et al. | 244/118.5 |

* cited by examiner

Fig. 3
Fig. 4
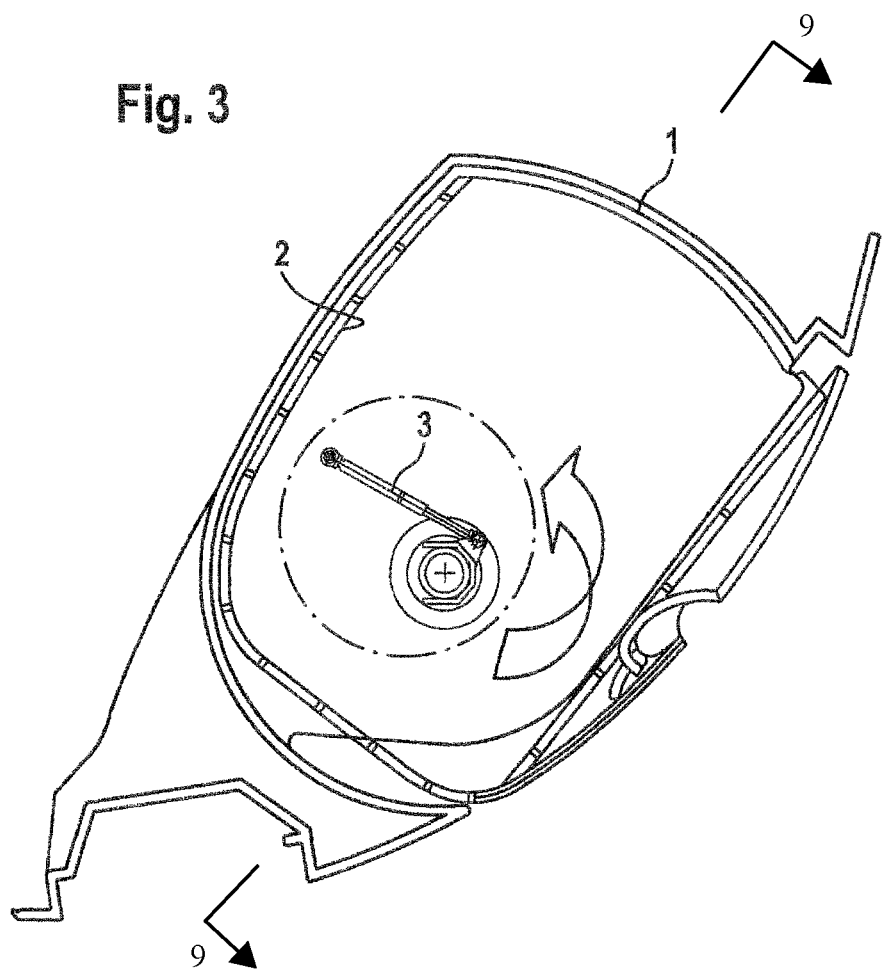
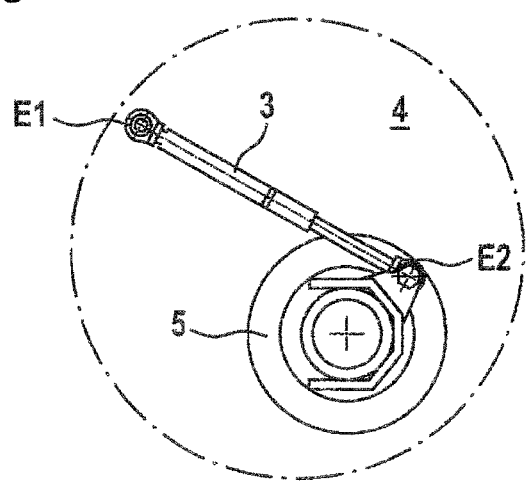

OVERHEAD LUGGAGE COMPARTMENT FOR VEHICLE CABIN

BACKGROUND

The invention relates to an overhead luggage compartment, in particular for a vehicle cabin.

Such an overhead luggage compartment is disclosed, for example, in DE 10 2007 003 363 A1. The overhead luggage compartments known from the prior art are often of complicated design and require a relatively high assembly cost.

It is the object of the invention to remedy the drawbacks of the prior art. In particular, an overhead luggage compartment which is of the simplest possible design and as easy as possible to assemble is intended to be provided.

SUMMARY

According to the invention, it is proposed that one end of the damper is attached to a ledge side wall and the other end of the damper is attached to a damper fastening element which is rotatably attached to the ledge side wall about the pivot axis, and a damper mating fastening element corresponding to the damper fastening element being fixedly attached to a housing half-shell side wall opposing the ledge side wall, so that with an engagement of the damper fastening element in the damper mating fastening element, a connection which is fixed in terms of rotation is able to be produced between the damper fastening element and the damper mating fastening element. In the proposed overhead luggage compartment, a damping device for damping a movement of the ledge may be preassembled as a whole on the ledge. In this connection, one end of the damper is pivotably attached to the ledge side wall in the conventional manner. The other end of the damper is also pivotably attached to a damper fastening element, which is rotatably attached to the ledge side wall about the pivot axis. When the ledge is inserted into the housing half-shell, the damper fastening element engages into a damper mating fastening element corresponding thereto, and which is fixedly attached to the housing half-shell. When the ledge is rotated, the damper mating fastening element thus secures the damper fastening element and thus the other end of the damper relative to the housing half-shell. When the ledge is rotated, a spacing between one end of the damper and the other end of the damper is altered and thus a damping effect is achieved. The proposed overhead luggage compartment is of simple construction and easy to assemble.

According to an advantageous embodiment of the invention, one end of the damper is attached to an outer face of the ledge side wall facing the housing half-shell and the other end is attached to the damper fastening element protruding in an intermediate space between the outer face and an opposing inner face of the housing half-shell side wall. In the proposed embodiment, the damper is thus located between the ledge side wall and the housing half-shell side wall. Thus an attachment of the damper inside the ledge and the resulting undesirable hindrance to the movement of the damper by pieces of luggage may be avoided.

According to a further advantageous embodiment, the ledge is preassembled as a mounting unit, in which one end of the damper is attached to the outer face of the ledge side wall and the other end is attached to the damper fastening element.

Preferably, the damper fastening element is rotatably held in a guide which is provided on a first axle bearing bush, and which engages in a first axle through-hole provided on the ledge side wall. The damper mating fastening element is expediently provided on a second axle bearing bush which engages in a second axle through-hole provided on the housing half-shell side wall. The damper mating fastening element may be configured, in particular, in one piece with the second axle bearing bush. Alternatively, the invention may also be designed in reverse in terms of kinematics. In this case, in an overhead luggage compartment, in particular for a vehicle cabin, in which a ledge is pivotably held about a pivot axis in a housing half-shell, it is provided that the ledge is connected to the housing half-shell via at least one damper for damping a pivoting movement, one end of the damper being attached to a housing half-shell side wall and the other end of the damper being attached to a damper fastening element which is rotatably attached to the housing half-shell side wall about the pivot axis, and a damper mating fastening element corresponding to the damper fastening element being fixedly attached to a ledge side wall opposing the housing half-shell side wall, so that with an engagement of the damper fastening element in the damper mating fastening element a connection which is fixed in terms of rotation may be produced between the damper fastening element and the damper mating fastening element. In the proposed overhead luggage compartment, the damping device as a whole may be preassembled on the housing half-shell. The damper mating fastening element, when inserting the ledge in the housing half-shell, engages in the damper fastening element corresponding thereto, which is rotatably attached to the housing half-shell side wall. When the ledge is rotated, the damper mating fastening element thus rotates the damper fastening element, so that a spacing is altered between the two ends of the damper and a damping effect is achieved.

The damping device may be attached both to an inner face and to an outer face of the housing half-shell side wall. Advantageously, one end of the damper is attached to an inner face of the housing half-shell side wall facing the ledge and the other end is attached to the damper fastening element protruding in an intermediate space between the inner face and an opposing outer face of the ledge side wall.

The housing half-shell may be preassembled as a mounting unit, in which one end of the damper is attached to the housing half-shell side wall and the other end is attached to the damper fastening element. This simplifies the assembly of the ledge.

According to an advantageous embodiment, the damper fastening element is rotatably held in a guide which is provided on a second axle bearing bush, and which engages in a second axle through-hole provided on the housing half-shell side wall. The damper mating fastening element may be provided in a first axle bearing bush, which engages in a first axle through-hole provided on the ledge side wall.

Advantageously, the damper fastening element has on its inner periphery two opposing planar axial surfaces and the damper mating fastening element has on its outer periphery two second planar axial surfaces corresponding to the first axial surfaces. By the term "axial surface" is understood a surface which extends approximately parallel to the pivot axis and/or to the axis of the axle through-holes. With the engagement of the damper fastening element in the damper mating fastening element, the first and second axial surfaces bear against one another so that a connection which is substantially fixed in terms of rotation is produced.

According to a particularly advantageous embodiment, a first axle bush is provided for inserting into the first axle bearing bush and the second axle bearing bush. As soon as the damper fastening element is in correct engagement with the damper mating fastening element, through-holes provided in the first and second axle bearing bushes are aligned. The connection between the damper fastening element and the damper mating fastening element may be secured by simply inserting the first axle bush into the first and second axle bearing bushes.

Advantageously, a first axle bearing comprising the first axle bush, and the first and the second axle bearing bushes is designed as a loose bearing. In this case, the first axle bush is axially movable relative to the first or second axle bearing bush. Thus, possibly occurring deformations of the housing half-shell may be compensated without damage. Such deformations may occur, for example, when the overhead luggage compartment is used in passenger aircraft in the event of turbulence or when landing.

A second axle bearing comprising a second axle bush, and a further first and a further second axle bearing bush is expediently designed as a fixed bearing. Thus undesired rattling or knocking of the ledge inside the housing half-shell may be avoided.

According to an advantageous embodiment, a bolt element which may be locked to the second axle bush is provided for producing an axial connection forming the fixed bearing between the further first and second axle bearing bushes. Such a bolt element further simplifies the assembly of the overhead luggage compartment.

The above disclosed damping device may be provided both on the first and on the second axle bearing. In the case of providing two damping devices, they are expediently of symmetrical design.

According to a further particularly advantageous embodiment, an electrical cable is guided through the first axle bush for connecting to an electrical device provided on the ledge, preferably a lighting means. The proposed electrical connection to an electrical device provided in the ledge may be produced in a particularly simple and cost-effective manner.

BRIEF DESCRIPTION OF THE DRAWINGS

An exemplary embodiment of the invention is described hereinafter in more detail with reference to the drawings, in which;

FIG. 3 shows the overhead luggage compartment according to FIG. 1 the ledge being closed, FIG. 4 shows a detailed view according to FIG. 3

DETAILED DESCRIPTION of EXEMPLARY EMBODIMENTS

Figure 1:
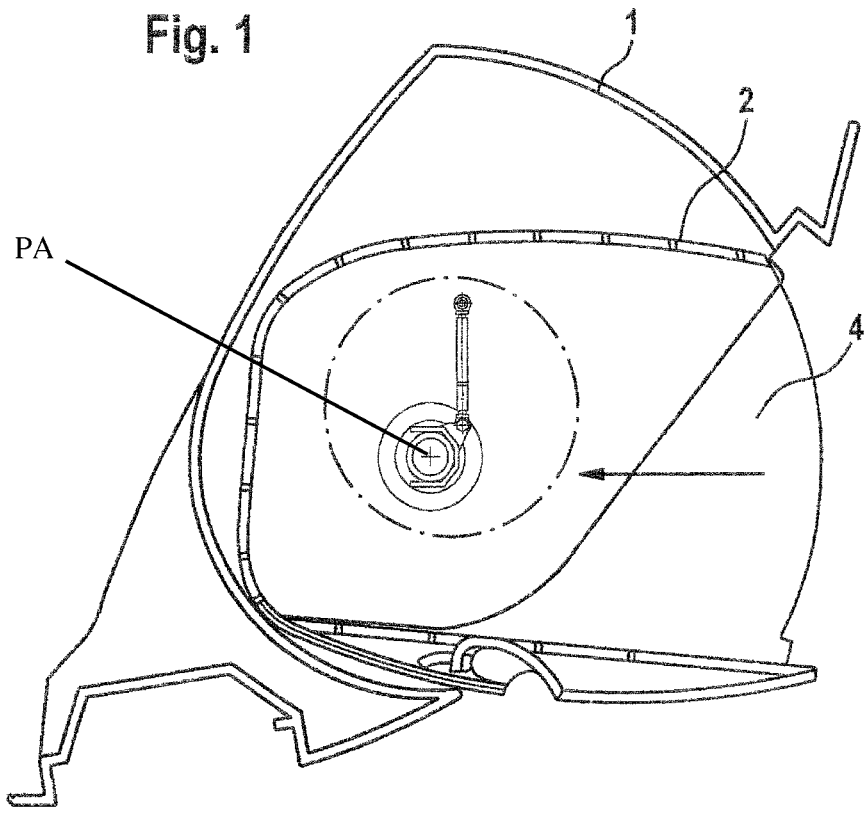
FIG. 1 shows a schematic side view of an overhead luggage compartment with the ledge open.
Figure 2:
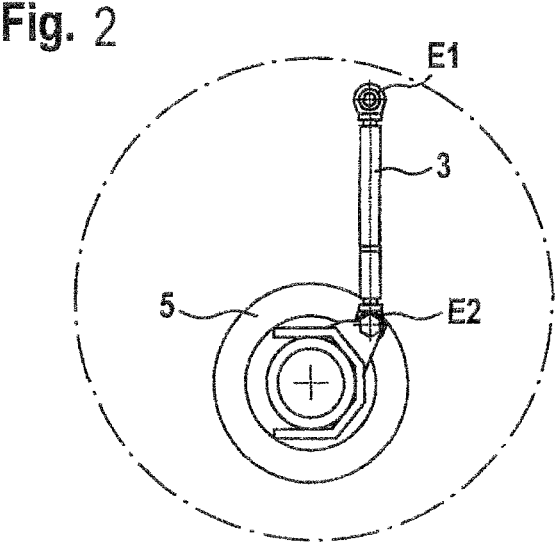
FIG. 2 shows a detailed view according to FIG. 1

In FIGS. 1 to 4 a ledge or a container 2 is pivotably received in a housing half-shell 1 which is preferably produced from plastics material, and held pivotably about a pivot axis PA located perpendicular to the drawing plane in this case. A damper is denoted by the reference numeral 3. One end E1 of the damper 3 is pivotably attached to an outer face of a ledge or container side wall 4. The other end E2 is pivotably attached to a damper fastening element 5. The damper fastening element 5 is connected fixedly in terms of rotation to the housing half-shell 1. In an alternative embodiment not shown in the figures, the end E1 of the damper 3 is pivotably attached to an inner face of a housing half-shell side wall; and the end E2 is pivotably attached to the damper fastening element 5 that is connected fixedly in terms of rotation to the container 2. The damper, the damper fastening element and the other related components can be mounted to the container or the housing half-shell in an interchangeable manner.

As is visible from FIGS. 3 and 4, when the ledge 2 is closed the damper 3 is in the extended state. By rotating the ledge 2 into an open position, one end E1 of the damper 3 is moved in the direction of the other end E2. The damper 3 is then located in a pushed-together position (see FIGS. 1 and 2).

Figure 5:
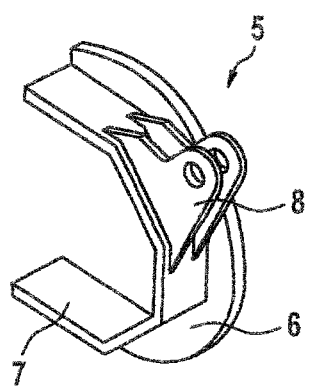
FIG. 5 shows a perspective view of a damper fastening element.

FIG. 5 shows a perspective view of a damper fastening element 5. The damper fastening element 5 is formed from a half-open annular disc 6, first axial surfaces 7 extending from one side thereof. In this case, two first axial surfaces 7 are arranged substantially parallel to one another. Brackets 8 are attached to an outer face of the axial surfaces 7 for the pivotable fastening of the second end E2 of the damper 3.

Figure 6:
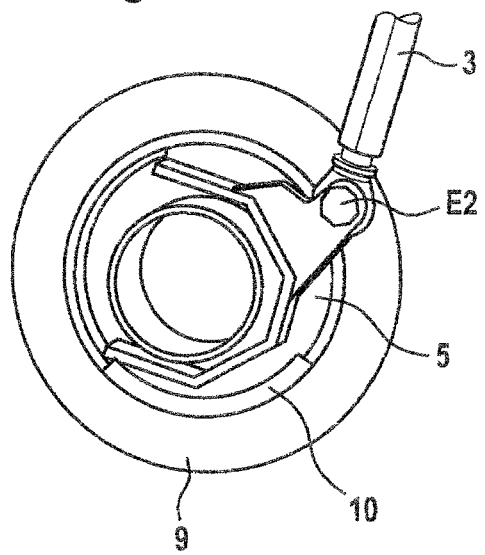
FIG. 6 shows a perspective view of a second axle bearing bush with the damper fastening element received therein.

FIG. 6 shows a perspective view of a first axle bearing bush 9 which has a guide 10 in which the damper fastening element 5 is rotatably received.

Figure 7:
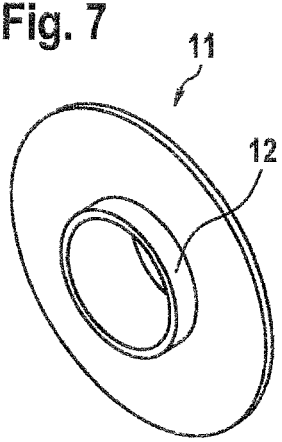
FIG. 7 shows a first perspective view of a first axle bearing bush.
Figure 8:
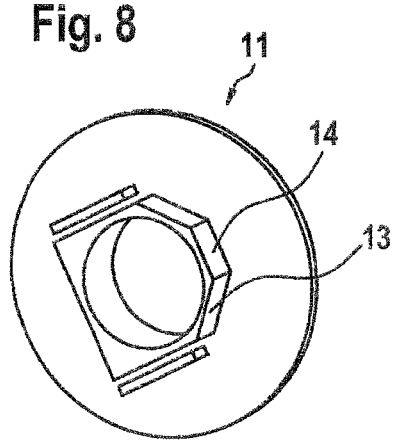
FIG. 8 shows a second perspective view of the first axle bearing bush.

FIGS. 7 and 8 show perspective views of the second axle bearing bush 11. The second axle bearing bush 11 has on one side thereof a tubular portion 12 for inserting into a second axle through-hole (not shown here) provided on a housing half-shell side wall. On the other side, in a one-piece design a damper mating fastening element 13 is integrally formed, the second axial surfaces 14 thereof being configured to correspond to the first axial surfaces 7 of the damper fastening element 5. As a result, by the radial insertion of the damper fastening element 5 into the damper mating fastening element 13 a connection which is fixed in terms of rotation may be produced between the second end E2 of the damper 3 and the second axle bearing bush 11.

Figure 9:
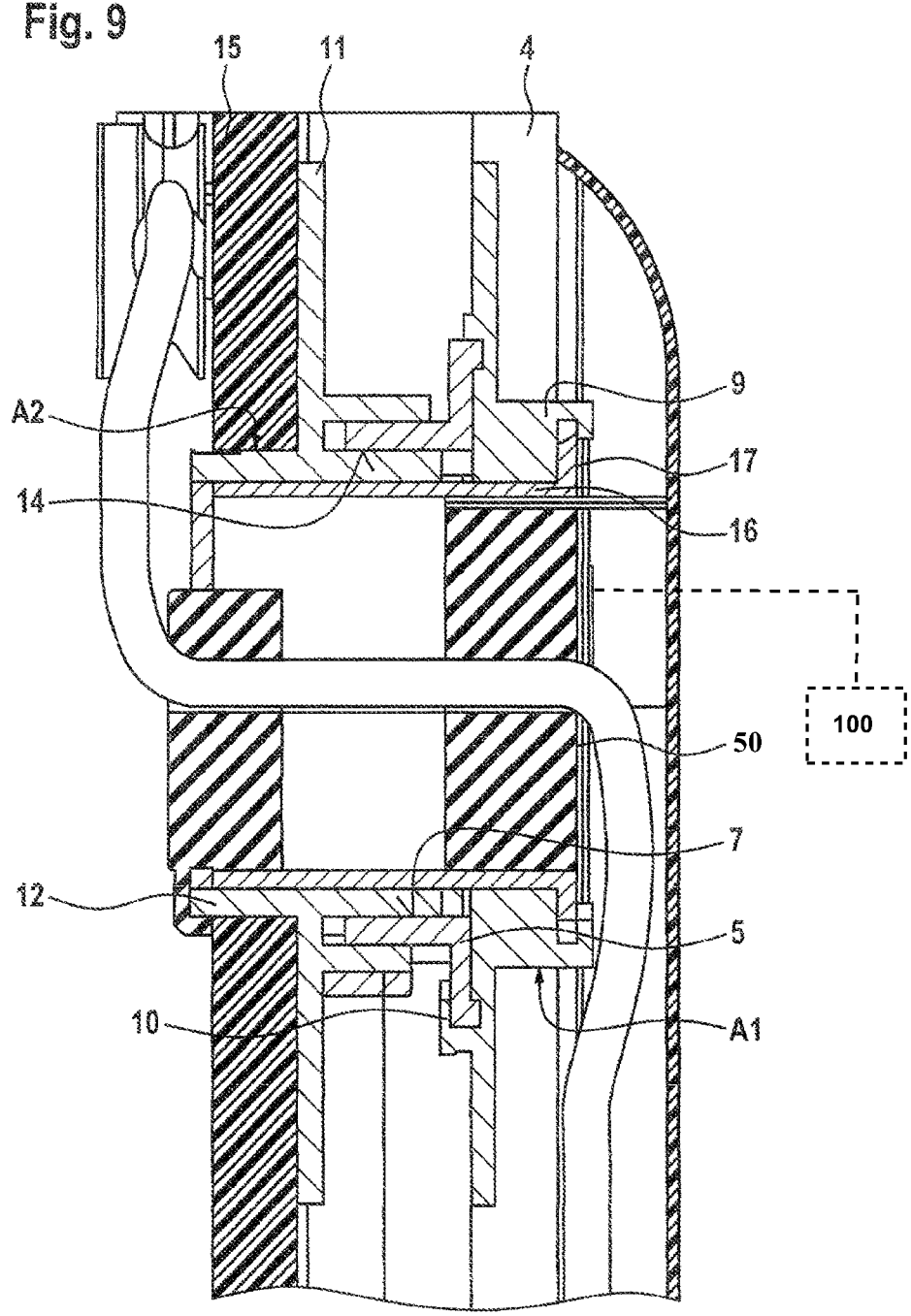
FIG. 9 shows a sectional view through a loose bearing and FIG. 10 shows a sectional view through a fixed bearing.

FIG. 9 shows a sectional view through a first bearing arrangement, which is designed as a loose bearing. The first axle bearing bush 9 is inserted into a first axle through-hole A1 provided on the ledge side wall 4, and fixedly connected to the ledge side wall 4, for example, by means of an adhesive connection. The damper fastening element 5 is rotatably guided in the guide 10 of the first axle bearing bush 9. The damper fastening element 5 engages with its first axial surfaces 7 positively in the second axial surfaces 14 which form the damper mating fastening element 13 and are provided on the second axle bearing bush 11. The tubular portion 12 of the second axle bearing bush 11 engages in a second axle through-hole A2, which is provided on a housing half-shell side wall 15. The second axle bearing bush 11 is, for example, also fixedly attached to the housing half-shell side wall 15 by an adhesive connection. A first axle bush is denoted by the reference numeral 16, which penetrates the first axle bearing bush 9 and the second axle bearing bush 11. A flange 17 extending from the axle bush 16 is secured on the first axle bearing bush 9, for example, by means of a circlip, a latching projection or the like. An electrical cable is denoted by the reference numeral 50, which is guided through the first axle bush 16 in an internal space of the ledge 2. As is visible from FIG. 9, the ledge side wall 4 is axially movable relative to the housing half-shell side wall 15. In the embodiment shown here of the bearing arrangement as a loose bearing, relative axial movements between the ledge 2 and the housing half-shell may be compensated.

Figure 10:
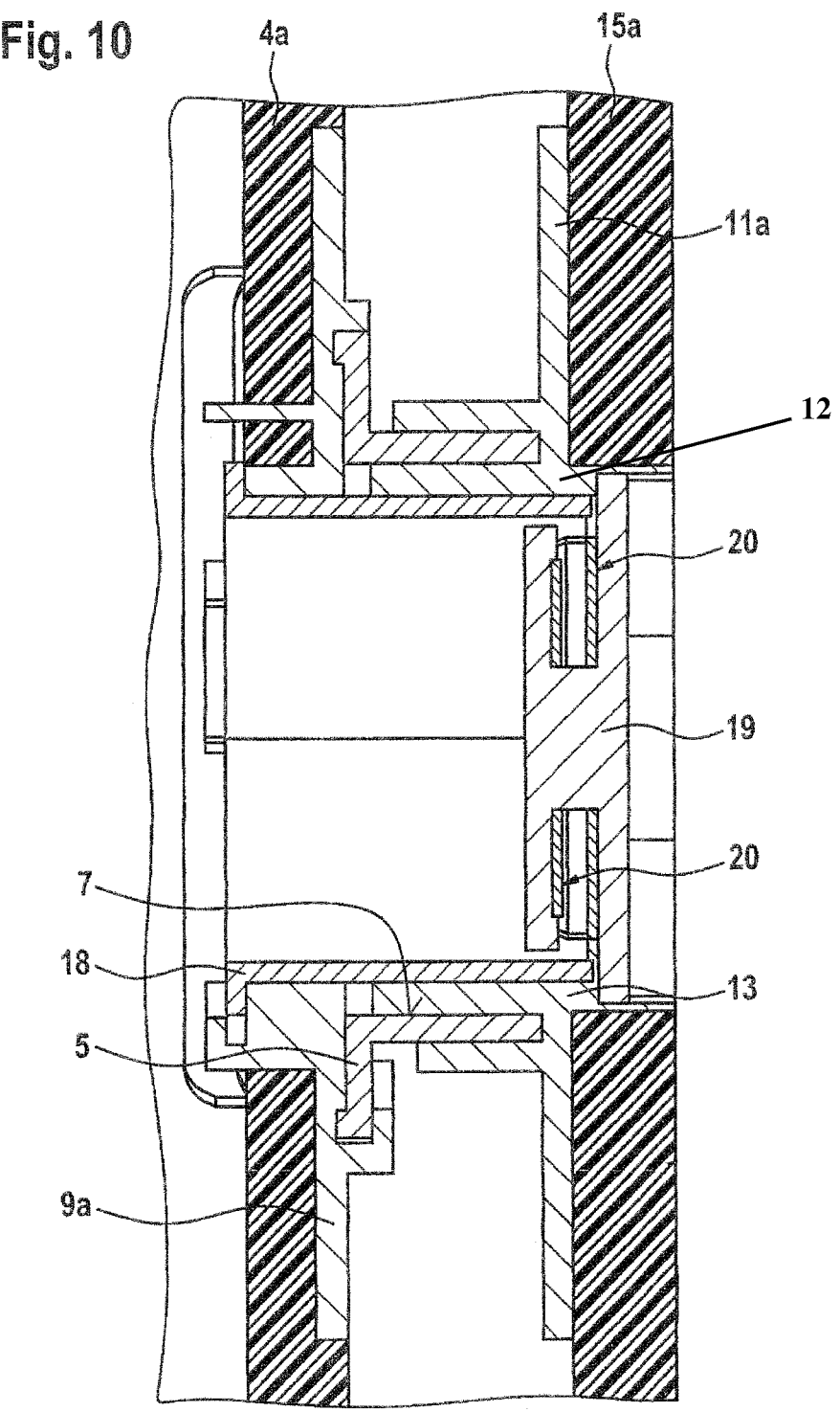

FIG. 10 shows a further bearing arrangement which may be provided on a further ledge side wall 4a and a further housing half-shell side wall 15*a*. In this case, a second axle bush 18 in the axial direction is axially locked to a further axle bearing bush 11*a* by means of a locking device 19. Spacer washers are denoted by the reference numeral 20, by means of which predetermined axial play may be adjusted relative to a further first axle bearing bush 9*a*.

The electrical cable can be guided through the first axle bush for connecting to an electrical device provided on the ledge, preferably a lighting means 100 as shown in FIG. 9.

List of Reference Numerals
1 Housing half-shell
2 Ledge
3 Damper
4 Ledge side wall
4*a* Further ledge side wall
5 Damper fastening element
6 Annular disc
7 First axial surfaces
8 Retaining element
9 First axle bearing bush
9*a* Further first axle bearing bush
10 Guide
11 Second axle bearing bush
11*a* Further second axle bearing bush
12 Tubular portion
13 Damper mating fastening element
14 Second axial surfaces
15 Housing half-shell side wall
15*a* Further housing half-shell side wall
16 First axle bush
17 Flange
18 Second axle bush
19 Locking element
20 Spacer washers
E1 End
E2 Second end
A1 First axle through-hole
A2 Second axle through-hole

The invention claimed is:

1. An overhead luggage compartment for a vehicle cabin, comprising:
 a container pivotably held about a pivot axis in a housing half-shell, wherein the housing half-shell comprises a housing half-shell side wall and the container comprises a container side wall, the housing half-shell side wall and the container side wall opposite each other,
 at least one damper, through which the container is connected to the housing half-shell, the damper being configured to damp a pivoting movement, the damper comprising a first end and an opposite second end, the first end of the damper attached to the container side wall,
 a damper fastening element, the second end of the damper attached to the damper fastening element, the fastening element rotatably attached to the container side wall about the axis, the damper fastening element comprising a half-open annular disc and a substantially C-shaped body,
 a first axle bearing bush comprising a guide, the guide defining a circumferential grove of the first axle bearing bush, the half-open annular disc being rotatably held in the guide and rotatable within the circumferential groove, and
 a damper mating fastening element corresponding to the damper fastening element, the damper mating fastening element fixedly attached to the housing half-shell side wall,
 wherein with an engagement of the damper fastening element to the damper mating fastening element, a connection, which is fixed in terms of rotation, is made between the damper fastening element and the damper mating fastening element.

2. The overhead luggage compartment according to claim 1, wherein said first end of the damper is attached to an outer surface of the container side wall, which outer surface faces the housing half-shell; and wherein said second end of the damper is attached to the damper fastening element which protrudes in an intermediate space between the outer surface of the container side wall and an opposing inner surface of the housing half-shell side wall.

3. The overhead luggage compartment according to claim 2, wherein the container is preassembled as a mounting unit, in which said first end of the damper is attached to the outer face of the container side wall and said second end of the damper is attached to the damper fastening element.

4. The overhead luggage compartment according to claim 1, wherein the first axle bearing bush engages in a first axle through-hole provided in the container side wall.

5. The overhead luggage compartment according to claim 4, further comprising a second axle bearing bush, wherein the second axle bearing bush engages a second axle through-hole providing in the housing half-shell side wall, wherein the second axle bearing bush comprises the damper mating fastening element.

6. The overhead luggage compartment, for a vehicle cabin, comprising:
 a container pivotably held about a pivot axis in a housing half-shell, wherein the housing half-shell comprises a housing half-shell side wall and the container comprises a container side wall, the housing half-shell side wall and the container side wall opposite each other,
 at least one damper, through which the container is connected to the housing half-shell, the damper being configured to damp a pivoting movement, the damper comprising a first end and an opposite second end, the first end of the damper attached to the housing half-shell side wall,
 a damper fastening element, the second end of the damper attached to the damper fastening element, the damper fastening element rotatably attached to the housing half-shell side wall about the pivot axis, the damper fastening element comprising a half-open annular disc and substantially C-shaped body,
 a first axis bearing bush comprising a guide, the guide defining a circumferential groove of the first axle bearing bush, the half-open annular disc being rotatably held by the guide and rotatable within the circumferential groove, and
 a damper mating fastening element corresponding to the damper fastening element, the damper mating element fixedly attached to the container side wall,
 wherein with an engagement of the damper fastening element to the damper mating fastening element, a connection, which is fixed in terms of rotation, is made between the damper fastening element and the damper mating fastening element.

7. The overhead luggage compartment according to claim 6 wherein, said first end of the damper is attached to an inner surface of the housing half-shell side wall, which inner surface faces the container; and wherein said second end of the damper is attached to the damper fastening element which protrudes in an intermediate space between the inner surface and an opposing outer surface of the container side wall.

8. The overhead luggage compartment according to claim 7, wherein the housing half-shell is preassembled as a mounting unit, with said first end of the damper attached to the housing half-shell side wall and said second end of the damper attached to the damper fastening element.

9. The overhead luggage compartment according to claim 6, wherein the first axle bearing bush engages in a first axle through-hole provided in the housing half-shelf side wall.

10. The overhead luggage compartment according to claim 9, further comprising a second axle bearing bush, wherein the second axle bearing bush engages a second axle through-hole provided in the container side wall, wherein the second axle bearing bush comprises the damper mating fastening element.

11. The overhead luggage compartment according to claim 1, wherein the damper fastening element comprises two first opposing planar axial surfaces provided on an inner periphery of the damper fastening element, and the damper mating fastening element comprises two second planar axial surfaces provided on an periphery of the damper mating fastening element, the second planar axial surfaces corresponding to the first axial surfaces.

12. The overhead luggage compartment according to claim 5, further comprising an axle bush provided for inserting into the first axle bearing bush and the second axle bearing bush.

13. The overhead luggage compartment according to claim 12, further comprising an axle bearing which comprises the axle bush.

14. The overhead luggage compartment according to claim 13, wherein the axle bearing is cinfigured to allow relative axial movement between the container side wall and the housing half-shell side wall.

15. The overhead luggage compartment according to claim 13, wherein the axle bearing comprises a locking element configured to lock the container side wall with the respect to the housing half-shell side wall.

16. The overhead luggage compartment according to claim 12, further comprising an electrical cable guided through the axle bush for connecting to an electrical device provided on the container.

17. The overhead luggage compartment according to claim 16, wherein said electrical device comprises a lighting means.

* * * * *